United States Patent

Dasgupta et al.

Patent Number: 5,304,778
Date of Patent: Apr. 19, 1994

[54] GLOW PLUG WITH IMPROVED COMPOSITE SINTERED SILICON NITRIDE CERAMIC HEATER

[75] Inventors: Sankar Dasgupta; James K. Jacobs; Stephen Radmacher, all of Toronto; Marek Sobczyk, Weston, all of Canada

[73] Assignee: Electrofuel Manufacturing Co., Toronto, Canada

[21] Appl. No.: 979,911

[22] Filed: Nov. 23, 1992

[51] Int. Cl.[5] .......................... H05B 3/00; F23Q 7/00; F02P 19/02
[52] U.S. Cl. .............................. 219/270; 123/145 A; 219/544; 219/552; 219/553; 252/518; 252/520
[58] Field of Search ............... 219/270, 552, 553, 544; 361/264–266; 123/145 R, 145 A; 252/518, 520

[56] References Cited

U.S. PATENT DOCUMENTS

| | | |
|---|---|---|
| 4,486,651 | 12/1984 | Atsumi et al. ............ 219/270 X |
| 4,499,366 | 12/1985 | Yoshida et al. ............ 219/270 |
| 4,556,780 | 12/1985 | Atsumi et al. ............ 219/270 |
| 4,598,676 | 7/1986 | Ito et al. ............ 123/145 |
| 4,633,064 | 12/1986 | Atsumi et al. ............ 219/270 |
| 4,634,837 | 1/1987 | Ito et al. ............ 219/270 |
| 4,644,133 | 2/1987 | Atsumi et al. ............ 219/270 |
| 4,682,008 | 7/1987 | Masaka ............ 219/270 |
| 4,742,209 | 5/1988 | Minegishi et al. ............ 219/270 |
| 4,806,734 | 2/1989 | Masaka et al. ............ 219/270 |
| 4,814,581 | 3/1989 | Nunogaki et al. ............ 219/270 |
| 4,816,643 | 3/1989 | Zulauf et al. ............ 219/270 |
| 5,206,484 | 4/1993 | Issartel ............ 219/270 |

Primary Examiner—Anthony Bartis

[57] ABSTRACT

An improved ceramic heater to be incorporated in a glow plug is described. The heater is made up of a ceramic core enclosed by two layers sintered together to form a unitary ceramic heater. All three component elements of the heater are composed of silicon nitride containing different concentrations of an electrically conductive ceramic substance, such as titanium nitride, titanium carbonitride or molybdenum disilicide. Each component additionally contains low amounts of sintering additives. The core of the heater has the highest concentration (46–75 vol. %) of the electrically conductive substance. The core enclosed in a ceramic layer which is an electrical insulator and is composed of silicon nitride, less than 28 vol. % of the electrically conductive ceramic substance and sintering additives. An outer layer over the core contains the electrically conductive ceramic substance in a concentration (33–50 vol. %) which is in between that in the core and that in the insulator layer. One end of the core is integrally connected to the outer layer over it. The ceramic heater is fitted into a glow plug housing. The core and the outer layer properly joined to appropriate connectors in the glow plug housing form an electrical circuit when connected to an electrical power source.

9 Claims, 3 Drawing Sheets

GLOW PLUG WITH IMPROVED COMPOSITE SINTERED SILICON NITRIDE CERAMIC HEATER

FIELD OF THE INVENTION

This invention relates to glow plugs utilized in diesel engines, more particularly to ceramic heaters, which are comprised by glow plugs.

It is known that diesel engines operate on the principle of compression combustion. The fuel combusted in diesel engines is usually a heavy oil having higher ignition temperatures and a far wider range of hydrocarbon composition than the more volatile and narrower composition range hydrocarbon fuels utilized in non-diesel automotive engines.

Diesel oils and fuels of such nature, are usually composed in substantial portion of high viscosity and high ignition temperature components. The flow and ignition characteristics of diesel fuel oils are such that fuels in this category require preheating, at least until the engine temperature has reached its operating temperature. Thus diesel-type engines need to be equipped with means to preheat the fuel before it can be combusted. The role of a glow plug is to preheat the diesel fuel or the diesel fuel-air mixture before it can be combusted by compression in a conventional diesel engine.

The preheating of the fuel before combustion may also be a requirement in engines which are run on fuels containing alcohol, such that are sometimes referred to as mixed fuels.

It is to be noted, that in the description hereinbelow reference to diesel engines is meant to include any engine design wherein preheating of the fuel, or of the fuel-air mixture, is desirable before internal combustion can take place. Hence a faulty or malfunctioning glow plug may lead to failure in the expected performance of the engine.

A glow plug usually consists of a ceramic heater and a metallic holder, the latter providing support and electrical connections. The heating action of the glow plug takes place on the external surface of the ceramic heater.

It is desirable that the high temperature of the surface of the ceramic heater is maintained for longer periods of time without damage to the heater, in case of very cold weather. This latter feature is usually referred to as after-glow.

In one form of a conventional glow plug a refractory metal wire or coil is embedded in an insulating and heat resistant ceramic material. The metal coil is connected to a power source usually by means of a housing supporting the embedded coil. When current passes through the coil or wire, it heats up and the ceramic material, such as silicon nitride, will in turn become hot. The coil usually has relatively small cross section hence high electrical resistance for generating heat. The small cross section of the coil or wire may cause problems in heat transfer, and will eventually lead to metal fatigue and similar detrimental results.

In another form of glow plug, ceramic materials which are electrically conductive and have much higher resistivity than a metal, are utilized in the heater portion of the glow plug. The electrically conductive ceramic material which is to be utilized in the ceramic heater, is conventionally made into a U-shape, sintered or fired, may be subsequently machined, and is then seated in a metallic glow plug housing. It is customary to have one arm of the U-shaped electrically conductive ceramic heater portion connected to a central metallic conductor located in the housing. The metallic conductor is usually electrically insulated from the glow plug housing. The other arm of the U-shaped ceramic conductor is in contact with the metallic glow plug housing. The glow plug housing, and within it the central conductor, are then connected in a conventional manner to a power source. When the glow plug is in operation electrical current flows through the U-shaped ceramic conductor. The ceramic heater portion of the glow plug has sufficient electrical resistance to heat up in a relatively short time to a temperature for assisting the combustion of the gas mixture.

The U-shaped heater portion of the conventional glow plug referred to above, such as is described in U.S. Pat. No. 4,806,734, issued to Masaka et al. on Feb. 21, 1989, for example, has a unitary composition and has a slit between the arms of the U-shape which is open to corrosive gases. The U-shaped ceramic portion, however, has no mechanical support. The lack of physical support provided to the U-shaped ceramic heater in this design of glow plug may allow the heater to be easily damaged by impact or similar mechanical forces. Moreover, in order to increase the electrical resistance of the appropriate portion and thus the temperature of the heater surface of the glow plug, the tip of the U-shaped ceramic heater is machined or fabricated to have a relatively thinner wall. Thus the tip becomes even more vulnerable to mechanical damage.

In another form of a conventional glow plug utilizing a heater member which is made of an electrically conducting ceramic material, the heater is of the shape of a closed tube or an open-sided U-shaped tube, mounted on and bonded to, a centrally located ceramic insulator. U.S. Pat. No. 4,486,651 issued to Kinya Atsumi et al. on Dec. 4, 1984, describes various embodiments of the above design. The various embodiments differ in the manner in which the tube with the closed end, or the U-shaped structure is connected to a metallic conductor for providing a current to it during the operation of the glow plug. In all the embodiments described in U.S. Pat. No. 4,486,651 and in other subsequent embodiments of this type of design, the electrically conductive ceramic heater has a uniform composition, thus a uniform conductivity. The conventional method of increasing the temperature of the glow plug surface during operation by reducing the wall thickness of the tip has also been applied to the various embodiments of U.S. Pat. No. 4,486,651.

Another possible disadvantage which may arise in utilizing the glow plug heater design described in U.S. Pat. No. 4,486,651, is that the metallic conductor which connects the resistive ceramic heater layer to the power source may come adrift during its operation. The ceramic heater layer of U.S. Pat. No. 4,486,651 supported by the insulator plate, is shown to be embedding the metallic conductor. The contact between the metallic connector and the ceramic heater layer may be severed during operation, due to differences in thermal coefficients of expansion, and thereby the glow plug may become inoperational.

Another glow plug device having an electrically conductive ceramic heater is described in U.S. Pat. No. 4,742,209 issued to Minegishi et al. on May 3, 1988. The heater of U.S. Pat. No. 4,472,209 is constructed of a closed end tube having a thinner walled tip, which is supported by and bonded to a tubular insulator. Within the tubular insulator is an electrically conductive ceramic rod having the same composition as the tube having a closed end. The disadvantage of such a glow plug heater design is that the conductivity of the electrically conductive elements within and without the insulator tube is the same, but due to differences in heat loss, their respective temperature during operation is different. Moreover, the coefficients of thermal expansion of the insulator and of the electrically conductive elements are also different, such that may lead to substantial thermal stress within the heater, resulting in cracks, spalling, and breakdown in the operation of the glow plug heater.

The electrically conductive ceramic component in the heaters of the above described conventional glow plugs, is molybdenum disilicide or titanium nitride mixed with silicon nitride and alumina and similar sintering assistive agents in small amounts. The insulator members on the other hand, are usually made of a mixture of silicon nitride and alumina. Thus the thermal expansion coefficient of the heater member is notably different from that of the insulator member.

SUMMARY OF THE INVENTION

It is the object of the present invention to provide a glow plug heater made of ceramic elements, wherein the resistivity of the elements which make up the heater is varied by adjusting the concentration of the electrically conductive ceramic component within the heater elements and within the insulator.

It is another object of the present invention to provide a ceramic heater for a glow plug, constructed from ceramic heater elements and insulator members, wherein the heater elements and the insulator member separating the heater elements, are made of ceramic compositions having coefficients of thermal expansion which have relatively similar values.

An improved heater for a glow plug is described which is comprised of an electrically resistive ceramic member and an insulator member, and the composition of the members of the ceramic heater essentially consists of silicon nitride containing an electrically conductive ceramic component in different concentrations. The electrically conductive ceramic component is selected from the group consisting of titanium nitride, titanium carbonitride, or molybdenum disilicide. The electrically resistive ceramic member is further comprised of a cylindrical ceramic tube having a closed end and an inner surface, and a ceramic rod which fits into, and is integrally sintered to the ceramic tube having a closed end, such that the ceramic rod and the inner surface of the cylindrical ceramic tube form an annular space between them. The cylindrical ceramic tube is composed of silicon nitride containing 33–50 vol. % electrically conductive ceramic component, and the ceramic rod is composed of silicon nitride containing 46–75 vol. % electrically conductive ceramic component, so that the electrical conductivity of the ceramic rod per unit volume exceeds the electrical conductivity of the cylindrical ceramic tube per unit volume. The insulator member comprised by the ceramic heater is a ceramic tube having dimensions corresponding to the annular space within the electrically resistive ceramic member and is essentially composed of silicon nitride containing 0.5–28 vol. % electrically conductive ceramic component.

The ceramic heater is subsequently sintered by heat treatment to form a sintered unitary heater. The ceramic heater is thereafter fitted into a metallic housing, the housing having a central metallic conductor which is insulated from the housing. The housing and central metallic conductor have means for connection to an electrical power source.

The preferred embodiment of the present invention will now be described by reference to the figures and illustrated by working examples.

DETAILED DESCRIPTION OF THE PREFERRED EMBODIMENT

Figure 1:
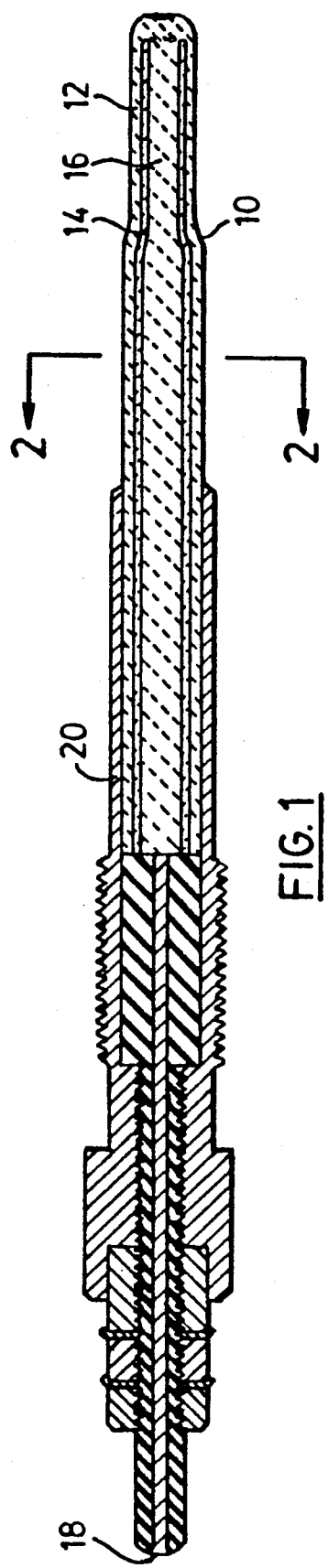
FIG. 1 is a schematic drawing of the glow plug heater of the present invention sectioned along its longitudinal axis.

Silicon nitride is used in most of the ceramic glow plug applications. This ceramic substance is resistant to high temperature, as well as to corrosive gases, may be cast into desired shapes and subsequently fired, and has the desired modulus and strength for this type of use. It is also durable and stable. Electrically silicon nitride is considered to be an insulator, that is its resistance is well over $10^{12}$ ohm.cm at high temperature. Ceramic substances which are not insulators and are known to have resistances in the order of $10^5$ ohm.cm and high temperature stability, include molybdenum disilicide, titanium nitride and titanium carbonitride. Hafnium nitride and zirconium nitride also have desirable resistive properties, but have so far been utilized in a lesser degree, presumably on account of preparative cost.

For the sake of clarity, resistivity of substances in general is understood to mean having relatively low electrical conductivity, when compared to metallic conductors. The resistivity of ceramic substances decreases with increasing temperature. Due to the relatively low conductivity, when electrical potential is applied to a body containing the required amount of such electrically resistive ceramic substances, the passage of the charge carrier generates heat. The conductivity of a resistive ceramic body is several orders of magnitude less than the conductivity of metals, and several orders of magnitude higher than that of an insulator.

It can thus be seen that the conductivity of a ceramic body made of a mixture of silicon nitride and an electrically conductive ceramic substance such as titanium nitride, titanium carbonitride and molybdenum disilicide will be directly proportional to the concentration of the electrically conductive substance intimately mixed in with the silicon nitride.

A sintered unitary ceramic heater body made up of two contiguous ceramic portions, each portion having the same concentration of the electrically conductive ceramic substance in the silicon nitride, will have the same electrical conductivity per unit volume in each portion of the ceramic heater. It is desirable that one portion of the unitary ceramic heater attains a higher temperature when an electrical potential is applied to such a body, than the other portion. In conventional glow plug designs such difference in temperature during use of the glow plug is achieved by reducing the geometric cross-section of the ceramic heater in the proximity of the tip of the heater. It has now been found that further improvements in the glow plug heater may be achieved by having different concentrations of the electrically conductive substance in the different portions of the unitary ceramic heater. The external portion of the improved heater, that is the portion designed to heat the combustible gases, has a lower concentration of the electrically conductive substance than the portion contiguous with it, located within and forming the inner core of the heater. When electrical potential is applied to the improved ceramic heater the temperature attained by the external portion of the heater, due to the lower conductivity or higher resistivity, will be higher than the core temperature of the heater due to the higher conductivity or lower resistivity of the contiguous inner portion. Thus in the improved heater the increased tip temperature during use is achieved by adjusting the concentrations of the electrically conductive component to be lower in the ceramic tube portion than in the contiguous ceramic rod portion.

It has been observed that silicon nitride containing 46–75 vol. % of titanium nitride, titanium carbonitride and molybdenum disilicide has a notable electrical conductivity; on the other hand, silicon nitride containing less than 28 vol. % of these substances will behave as a good insulator. It has now been unexpectedly found that while the electrical properties of a silicon nitride containing titanium nitride, titanium carbonitride and molybdenum disilicide will depend on the concentration of these substances, the thermal expansion coefficient of the mixture depends only to a small extent on their respective concentration. More specifically, the thermal expansion coefficient of the heater elements and the insulator in contact with the elements of the glow plug of the present invention, is of the order of $10^{-6}$ per degree. Thus it has surprisingly been found that when a ceramic body, having elements or portions made of silicon nitride containing different concentrations of the electrically conductive ceramic substance, is sintered into a unitary ceramic body and is then allowed to heat up such that the different portions attain different temperatures, no cracking, spalling and similar manifestations of thermal stress have been observed. No detrimental effect could be observed when the heating cycle of the ceramic body was repeated several times.

In the preferred embodiment of the invention a ceramic tube having a closed end, is cast from a mixture of silicon nitride and 33–50 vol. % titanium nitride, titanium carbonitride or molybdenum disilicide. In order to improve the sinterability, sintering agents such as yttria, alumina and/or aluminium nitride, are added, in a total concentration of less than 6 vol. %.

A ceramic rod is subsequently cast from a mixture containing silicon nitride and 46–75 vol. % titanium nitride, titanium carbonitride and molybdenum disilicide, and sintering additives. The dimensions of the ceramic rod are such, that it fits into the ceramic tube and is made contiguous with the inner face of the closed end of the previously cast ceramic tube. Thus a unitary electrically resistive cast ceramic body, having an annular gap, is formed.

In a subsequent step, a third mixture is made of silicon nitride containing less than 28 vol. % of the above listed electrically conductive ceramic substance, as well as sintering additives. A tubular shaped body, which in subsequent discussions will be referred to as a tubular member having open ends, and dimensions which correspond to the annular gap in the electrically resistive ceramic body formed of the first and second mixtures hereinabove, is cast from the third mixture. The tubular member made of the third mixture is thereafter fitted into the annular gap. Thus a unitary cast ceramic body formed of three elements or members, and having compositions of silicon nitride containing three different concentrations of an electrically conductive ceramic component, is formed. The cast ceramic body is subsequently sintered by firing at temperatures higher than 1600° C.

The sintered unitary ceramic body obtained by the method and steps described hereinabove, has a rod which has the highest conductivity, a tubular member which is sintered to the surface of the rod and has electrically insulating properties, and an outer tube, having a closed end. The outer tube is enclosing and is sintered to the cylindrical surface of the tubular member, nd to the distal end of the rod. The outer tube has an electrical conductivity which is less than the electrical conductivity of the rod, but is substantially higher than the electrical conductivity of the tubular member. Thus a unitary body is obtained which is made up of 3 layers sintered together, each of which has different electrical properties. However, although the electrical conductivities of the sintered contiguous layers differ, the unitary body will not show noticeable thermal stress when heated to high temperature and subsequently cooled. The absence of thermal stress is due to the fact that all three layers are made of silicon nitride containing one of the electrically conductive ceramic components referred to above and sintering additives, thereby having similar thermal expansion of heat coefficients ranging between 3.6 and $7.0 \times 10^{-6}$ per °C.

It can thus be seen that the unitary body so obtained can be utilized as a ceramic heater in a glow plug, and will have improved thermal shock resistance together with unexpected combination of electrical and thermal properties.

In the ceramic heater obtained by the above process wide concentration ranges of titanium nitride, titanium carbonitride and molybdenum disilicide may be utilized. It is to be noted that it is essential in obtaining a workable ceramic heater of this invention that the concentration of the electrically conductive component such as any one of titanium nitride, titanium carbonitride and molybdenum disilicide, is higher in the sintered rod, or in the core of the heater than in the outer tube. In other words, it is an important feature of this invention that the electrical conductivity per unit volume of the rod exceeds the electrical conductivity per unit volume of the outer tube, and that both conductivities substantially exceed the conductivity per unit volume of the tubular member which separates the rod from the outer tube.

The preferred concentration ranges to provide the best ceramic heater according to this invention is as follows:
  55–62 vol. % of TiN, TiCN or $MoSi_2$ dispersed in $Si_3N_4$, as core composition;
  15–26 vol. % of TiN, TiCN or $MoSi_2$ dispersed in $Si_3N_4$, as tubular ring composition; and
  35–45 vol. % of TiN, TiCN or $MoSi_2$ dispersed in $Si_3N_4$, as outer tube composition.

The ceramic heater of this invention is fitted into a metallic glow plug housing in the conventional manner. The glow plug housing usually has a central metallic conductor insulated from the housing. The central metallic conductor or its equivalent is connected by conventional manner to the rod of the heater, and the outer tube of the heater is brought in contact in with the metallic glow plug housing in a conventional manner. The glow plug usually has means to connect it to a power source or a battery, and thereby current will be able to pass through the heater in the desired manner during the operation of the glow plug.

Some form of a switching mechanism is usually incorporated in the above circuit, so that electrical current for generating heat flows in the heater only when this is required.

The above described manner in which the members of the ceramic heater are assembled, that is the steps preceding sintering to obtain the unitary ceramic glow plug heater of the present invention, is only one of the preferred methods. There may be other conventional methods by means of which a sintered ceramic heater comprising three members as specified hereinabove may be obtained.

Another step sequence utilizing conventional technique to assemble the ceramic heater may be: first obtaining a ceramic rod of the desired composition, then wrapping around the rod an insulating layer having the composition as specified above, then fitting the rod into a tube having one end closed and having a composition as described above, in such a manner that one end of the rod is in contact with the inner face of the tube. The unitary, 3-membered green ceramic heater is then subjected to sintering.

It is to be noted, however, that whichever conventional step sequence is utilized, the sintered unitary heater of this invention is comprised of i) a ceramic rod having the highest population per unit volume of the electrically conductive ceramic component, ii) enclosed by a ceramic tubular member having the lowest population per unit volume of the electrically conductive ceramic component, which is further enclosed by iii) a ceramic outer tube sintered to the tubular member and to the distal end of the core, having an intermediate population per unit volume of the electrically conductive ceramic component.

The glow pug heater of the present invention may be further improved by having a tapered tip. In this form the outer tube of the heater has a smaller cross section at its distal end, that is where it is sintered to the rod, than further along the length of the heater, close to the end designed to be supported by the glow plug housing. This latter feature will further increase the resistivity, and thereby the tip temperature of the heater during operation. This feature however, is by no means essential to the operation of the glow plug heater of this invention.

The efficient operation of the ceramic glow plug heater described hereinabove may be further enhanced by having the ceramic rod containing the highest concentration of the electrically conductive component, that is the heater member having the highest conductivity within the ceramic heater, extending beyond the length of the outer tube and the insulator tube. The rod portion of the sintered unitary heater in this further improved design, will thus extend beyond the open end of the ceramic heater tube. The advantage of such an optional design feature is that the rod portion may be more easily and securely connected to the central conductor of the glow plug housing. Any conventional method may be used to connect the rod portion of the heater of the present invention to the metallic conductor, which serves as means to electrically connect the heater to a power source. Similarly, the outer tube of the heater may be connected to and supported in any conventional manner by the glow plug housing.

The particular advantage of the heater of this invention is that the resistivity of the rod portion of the heater is notably below that of the outer portion of the heater, therefore heat is primarily generated on the surface of the heater which is exposed to the gases to be combusted.

Another advantage of the present glow plug heater is that the metallic parts within the glow plug are completely shielded and protected from the corrosive gases generated by combustion. The possibility of a short circuit between the central conductor means of the glow plug and the housing is thereby greatly reduced and the life of the glow plug may be extended substantially.

As discussed above, yet another advantage of the present glow plug heater design is that all the elements of the heater have similar chemical components, and therefore similar thermal expansion coefficients. The heater of the present invention has increased shock resistance and the likelihood of the heater developing cracks, or spalling of the ceramic layer is greatly reduced. This feature leads to stable operation of the glow plug even after repeated heat cycling, and prolonged glow plug life.

A further advantage of the present heater for a glow plug is that it has a shorter response time than most conventional glow plug heaters, due to improvements in the manner the conductive ceramic members are designed and assembled.

The following examples will illustrate the constructing and the working of the glow plug heater of the present invention.

EXAMPLE 1

In order to manufacture the ceramic heater of the present invention three different mixtures of ceramic substances were made up as follows:

Mixture A was made up of silicon nitride containing 60 vol. % molybdenum disilicide, Mixture B was made up of silicon nitride containing 40 vol. % molybdenum disilicide, and Mixture C was made up of silicon nitride containing 25 vol. % molybdenum disilicide.

To each mixture yttria and alumina were added in approximately equal proportions, that is such that $Y_2O_3$: $Al_2O_3 = 1:1$, as sintering additives. The sintering additives were added to each mixture in amounts not exceeding 6 vol. %. Each of the above mixtures was individually first ballmilled, then vibromilled using conventional equipment. To each milled mixture a commercially available organic binding agent was added, such as methyl cellulose, or ammonium polyacrylate, marketed under the Trade name "Darvan 821" by R. T. Vanderbilt.

Other organic binders which may be used are: polyacrylic acids, polyethylene oxides, cellulose based polymers and other chemical equivalents. The organic binding agent is added to and mixed with each milled mixture in the form of an aqueous solution, in amounts and concentrations recommended by the company marketing the organic binder. Thus separate aqueous slurries of Mixture A, Mixture B and Mixture C were obtained.

Ceramic rods, having 1.8 mm diameter and 68 mm length were cast from Mixture A. Ceramic tubes, having a closed end, wall thickness close to 1.25 mm and about 68 mm length, were cast from Mixture B. A ceramic rod was placed into each closed ended tube and gentle pressure applied to it, so that one end of the ceramic rod made of Mixture A was contiguous with the inner surface of the closed end of the tube made of Mixture B. There was an annular gap between the ceramic rod made of Mixture A and the tube made of Mixture B. The above elements constructed as described, provided the electrically resistive ceramic member of the glow plug heater.

A ceramic tube having slightly more than 1.8 mm internal diameter and 1.2 mm wall thickness, was made up of Mixture C. 68 mm long segments were cut from the tube, and into each annular gap a tube segment made of Mixture C and referred to hereinabove as a tabular member, was inserted, in such a manner that the tube made of Mixture C became contiguous with the inner surface of the closed end tube made of Mixture B.

The unitary ceramic structure comprising 3 elements made of Mixture A, Mixture B and Mixture C, was subsequently sintered at 1850° C. in a pressurized inert gas atmosphere, for a period of 1-2 hours. The obtained sintered unitary glow plug heater could be handled with ease, was not subject to breaking when normal pressure was applied to it, and had good impact resistance.

The cross section of the glow plug heater cut along its longitudinal axis is shown on FIG. 1. The glow plug heater is represented by 10. The outer tube, made of Mixture B is represented by 12, and the rod of the heater ma Mixture A is indicated by 16. The insulating tubular member or layer made of Mixture C is represented by 14. The interface where the ceramic rod 16 is sintered to the outer tube is shown by a broken vertical line on FIG. 1. The rod 16, is connected to the schematically shown central conductor 18, of the glow plug housing. The outer tube, at the end opposing the closed end, is schematically supported and is connected to the glow plug housing 20.

Figure 2:
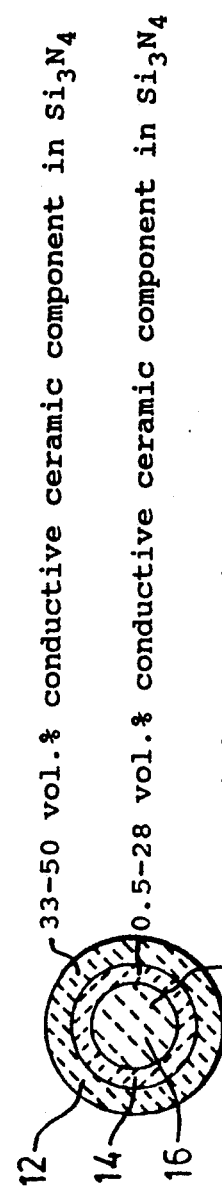
FIG. 2 shows the schematic enlarged cross section of the glow plug heater of the present invention in the plane of its shorter axis taken along lines 2—2 of FIG. 1.

A cross section of the heater in the indicated plane 2—2 is shown in FIG. 2. Like numerals shown in the Figures represent like elements of the glow plug heater.

EXAMPLE 2

Figure 3:
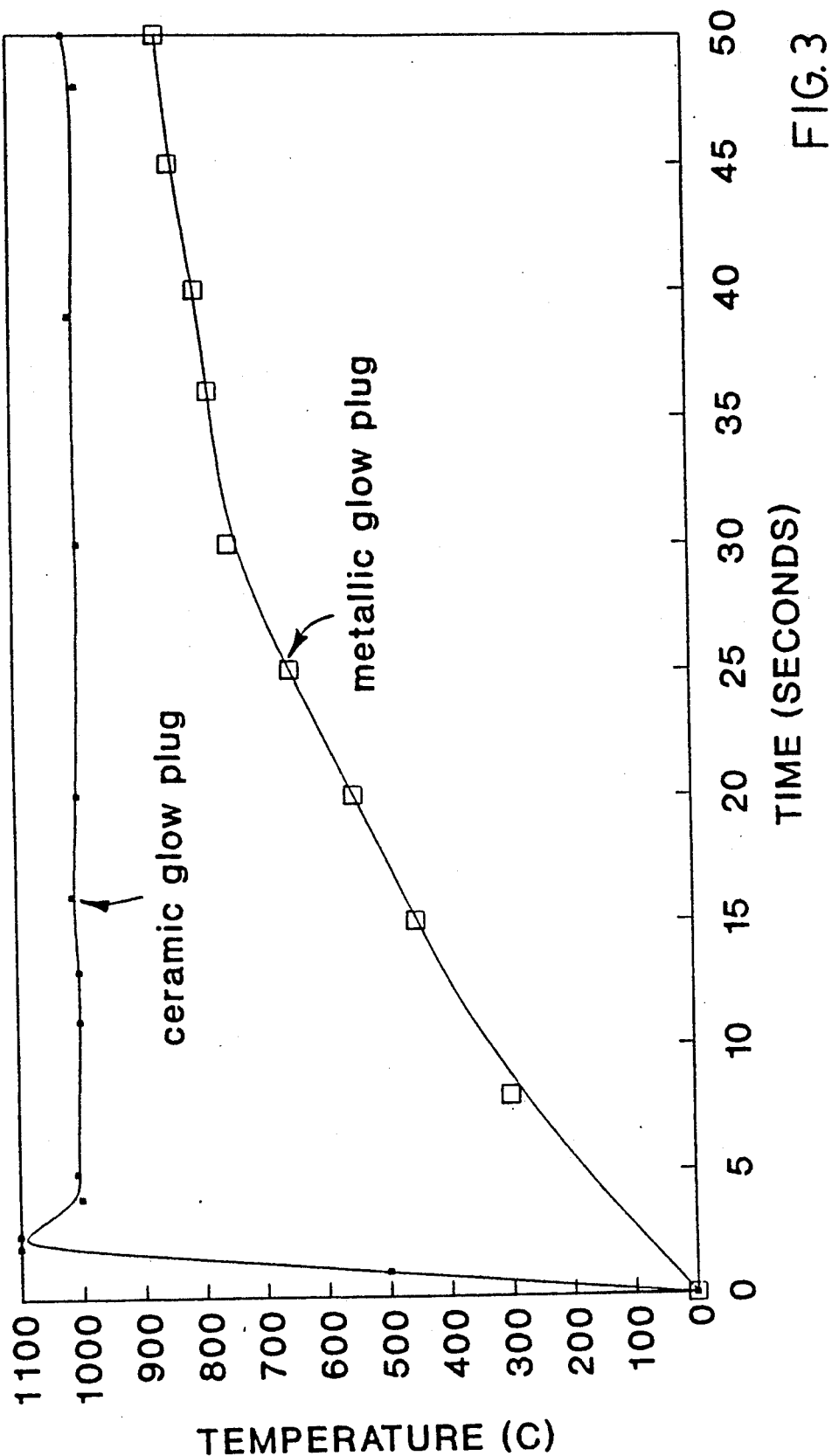
FIG. 3 shows response time of the glow plug of the present invention.

The glow plug heater made as described in Example 1 was placed in a commercially available metallic glow plug housing. The outer tube was connected to the central connector and the housing, respectively, in the conventional manner. The glow plug was then incorporated in an electrical circuit by connecting it to a power source such as a battery. The glow plug was tested by applying electrical potential to it. The time taken by the glow plug to reach a required temperature, as the function of the voltage applied was measured. This time period is usually referred to as response time. The response time of the glow plug made according to the present invention and that of a conventional glow plug are plotted on FIG. 3.

It can be seen that the glow plug of the present invention has a shorter response time than the conventional glow plug.

EXAMPLE 3

Figure 4:
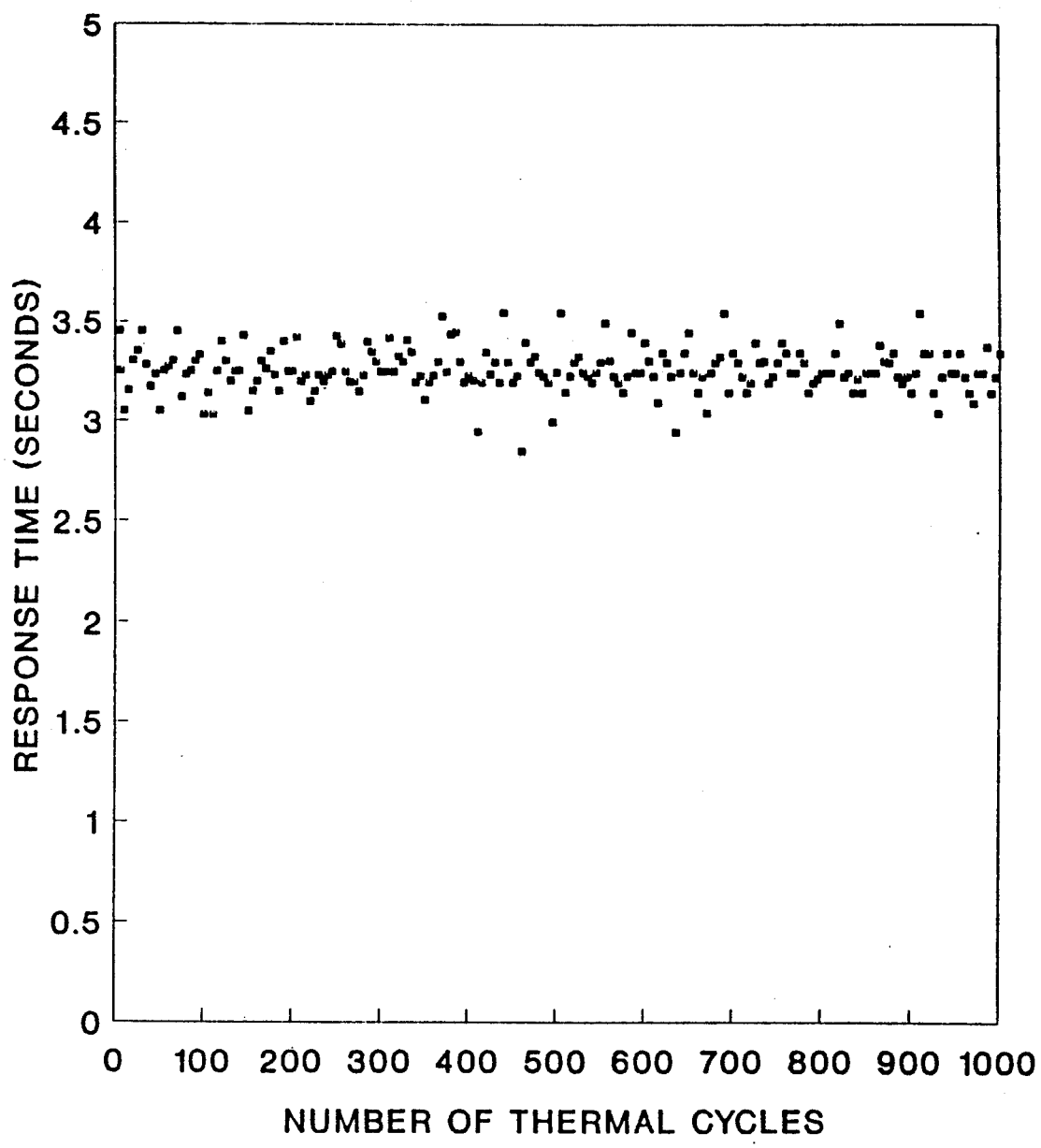
FIG. 4 illustrates the performance of the present glow plug after repeated temperature cycling.

The glow plug heater made as described in Example 1, supported and connected to a conventional glow plug housing, was incorporated in an electrical circuit in the usual manner. The glow plug heater was allowed to attain the usual operating temperature, then switched off and allowed to cool. The heating and cooling cycle of the glow plug was repeated several times. The performance of the glow plug after prolonged cycling is shown in FIG. 4.

This test indicates that the glow plug of the present invention is capable of repeated performance without cracking, shorting, spalling or similar detrimental effects. In other words it has a prolonged life.

Although the present invention has been described with reference to the preferred embodiment, it is to be understood that modifications and variations may be resorted to without departing from the spirit and scope of the invention, as those skilled in the art will readily understand. Such modifications and variations are considered to be within the purview and scope of the invention and the appended claims.

We claim:

1. In a glow plug for a diesel engine, said glow plug having a metallic housing for supporting a ceramic heater and providing electrical contact means for the ceramic heater, said ceramic heater comprising an electrically resistive ceramic member and a ceramic insulator member, said housing being connectable to an electrical power source, the improvement comprising, that said ceramic heater is essentially consisting of silicon nitride containing an electrically conductive ceramic component selected from the group consisting of titanium nitride, titanium carbonitride and molybdenum disilicide;

said electrically resistive ceramic member comprised by said ceramic heater further comprises a cylindrical ceramic tube having a closed end and an inner surface, and a ceramic rod, said ceramic rod being integrally sintered to said inner surface in the proximity of said closed end, thereby forming an annular space between said ceramic rod and said inner surface of said ceramic tube, said cylindrical ceramic tube having the composition of silicon nitride containing 33-50 vol. % electrically conductive ceramic component, said ceramic rod having the composition of silicon nitride containing 46-75 vol. % said electrically conductive ceramic component, such that the conductivity of said ceramic rod per unit volume exceeds the conductivity of said cylindrical ceramic tube per unit volume, and said ceramic insulator member comprised by said ceramic heater is a tubular member inserted and subsequently sintered to said cylindrical ceramic tube in said annular space, said ceramic insulator member having the composition of silicon nitride containing 0.5-28 vol. % said electrically conductive ceramic component.

2. An improved glow plug as recited in claim 1, wherein said cylindrical ceramic tube comprised by said electrically resistive ceramic member contains 35-44 vol. % titanium nitride, and said ceramic rod contains 55-62 vol. % titanium nitride, and said tubular insulating member contains 15-26 vol. % titanium nitride.

3. An improved glow plug as recited in claim 1, wherein said cylindrical ceramic tube comprised by said electrically resistive ceramic member contains 35-44 vol. % molybdenum disilicide, and said ceramic rod contains 55-62 vol. % molybdenum disilicide, and said tubular insulating member contains 15-26 vol. % molybdenum disilicide.

4. An improved glow plug as recited in claim 1, wherein said ceramic heater composed of silicon nitride and an electrically conductive ceramic component additionally contains at least one sintering additive selected from the group consisting of yttrium oxide, aluminium nitride and aluminium oxide.

5. A method of making an improved ceramic heater for a glow plug, comprising the steps of:
   i) preparing a first mixture containing silicon nitride, at least one sintering additive selected from the group consisting of yttrium oxide, aluminium oxide and aluminium nitride, and 33-50 vol. % electrically conductive ceramic component selected from the group consisting of titanium nitride, titanium carbonitride and molybdenum disilicide, and thereafter casting a first ceramic tube, having a closed end and an internal diameter, made of said first mixture;
   ii) preparing a second mixture containing silicon nitride, at least one sintering additive selected from the group consisting of yttrium oxide, aluminium oxide and aluminium nitride, and 46-75 vol. % electrically conductive ceramic component selected from the group consisting of titanium nitride, titanium carbonitride and molybdenum disilicide, and thereafter casting a ceramic rod having a diameter which is less than said internal diameter of said ceramic tube cast in step i), made of said second mixture;
   iii) attaching the cast rod so obtained within said first cast tube in the proximity of the closed end, thereby forming an annular space around said rod and obtaining a unitary casting of an electrically resistive ceramic member;
   iv) preparing a third mixture containing silicon nitride, at least one sintering additive selected from the group consisting of yttrium oxide, aluminium oxide and aluminium nitride, and 0.5-28 vol. % electrically conductive ceramic component selected from the group consisting of titanium nitride, titanium carbonitride and molybdenum disilicide, and thereafter casting a second ceramic tube having a diameter and a wall thickness substantially corresponding to said annular space formed in step iii), thereby obtaining a tubular insulating member, subsequently inserting said tubular insulating member into said annular space, thereby obtaining a unitary casting of a ceramic heater;
   v) sintering the unitary casting so obtained, thereby obtaining a sintered unitary ceramic heater having a core composition, as defined in step ii), a insulating member sintered to said core having a composition as defined in step iv) and an outer tube sintered to said tubular insulating member and to one end of said core, having a composition as defined in step i).

6. An improved unitary ceramic heater for a glow plug comprising, a rod composed of silicon nitride, at least one sintering additive selected from the group consisting of yttrium oxide, aluminium oxide and aluminium nitride, and 46-75 vol. % electrically conductive ceramic component selected from the group consisting of titanium nitride, titanium carbonitride and molybdenum disilicide, a tubular insulating member surrounding said rod and being bonded to said rod, composed of silicon nitride, at least one sintering additive selected from the group consisting of yttrium oxide, aluminium oxide and aluminium nitride, and 0.5-28 vol. % electrically conductive ceramic component selected from the group consisting of titanium nitride, titanium carbonitride and molybdenum disilicide, and an outer tube having a closed end, the inner surface of said outer tube being bonded to said tubular insulating member and to one end of said rod, composed of silicon nitride, at least one sintering additive selected from the group consisting of yttrium oxide, aluminium oxide and aluminium nitride, and 3-50 vol. % electrically conductive ceramic component selected from the group consisting of titanium nitride, titanium carbonitride and molybdenum disilicide.

7. An improved unitary ceramic heater as claimed in claim 6, wherein the closed end of said outer tube is tapered.

8. An improved ceramic heater as claimed in claim 6, wherein said rod of said unitary ceramic heater extends beyond the length of said tubular insulating member and the open end of said outer tube.

9. An improved glow plug for a diesel engine comprising, a metallic housing adapted to support a ceramic heater and having means to provide electrical contact to said heater, and being connectible to a power source, and a unitary ceramic heater comprising, a rod composed of silicon nitride, at least one sintering additive selected from the group consisting of yttrium oxide, aluminium oxide and aluminium nitride, and 46-75 vol. % electrically conductive ceramic component selected from the group consisting of titanium nitride, titanium carbonitride and molybdenum disilicide, a tubular insulating member surrounding said rod and being bonded to said rod, composed of silicon nitride, at least one sintering additive selected from the group consisting of yttrium oxide, aluminium oxide and aluminium nitride, and 0.5-28 vol. % electrically conductive ceramic component selected from the group consisting of titanium nitride, titanium carbonitride and molybdenum disilicide, and an outer tube having a closed end, the inner surface of said outer tube being bonded to said tubular insulating member and to one end of said rod, composed of silicon nitride, at least one sintering additive selected from the group consisting of yttrium oxide, aluminium oxide and aluminium nitride, and 33-50 vol. % electrically conductive ceramic component selected from the group consisting of titanium nitride, titanium carbonitride and molybdenum disilicide.

* * * * *